Feb. 19, 1924.
W. R. KIGHTLINGER
CLEAT REMOVER
Filed July 19, 1922
1,484,222
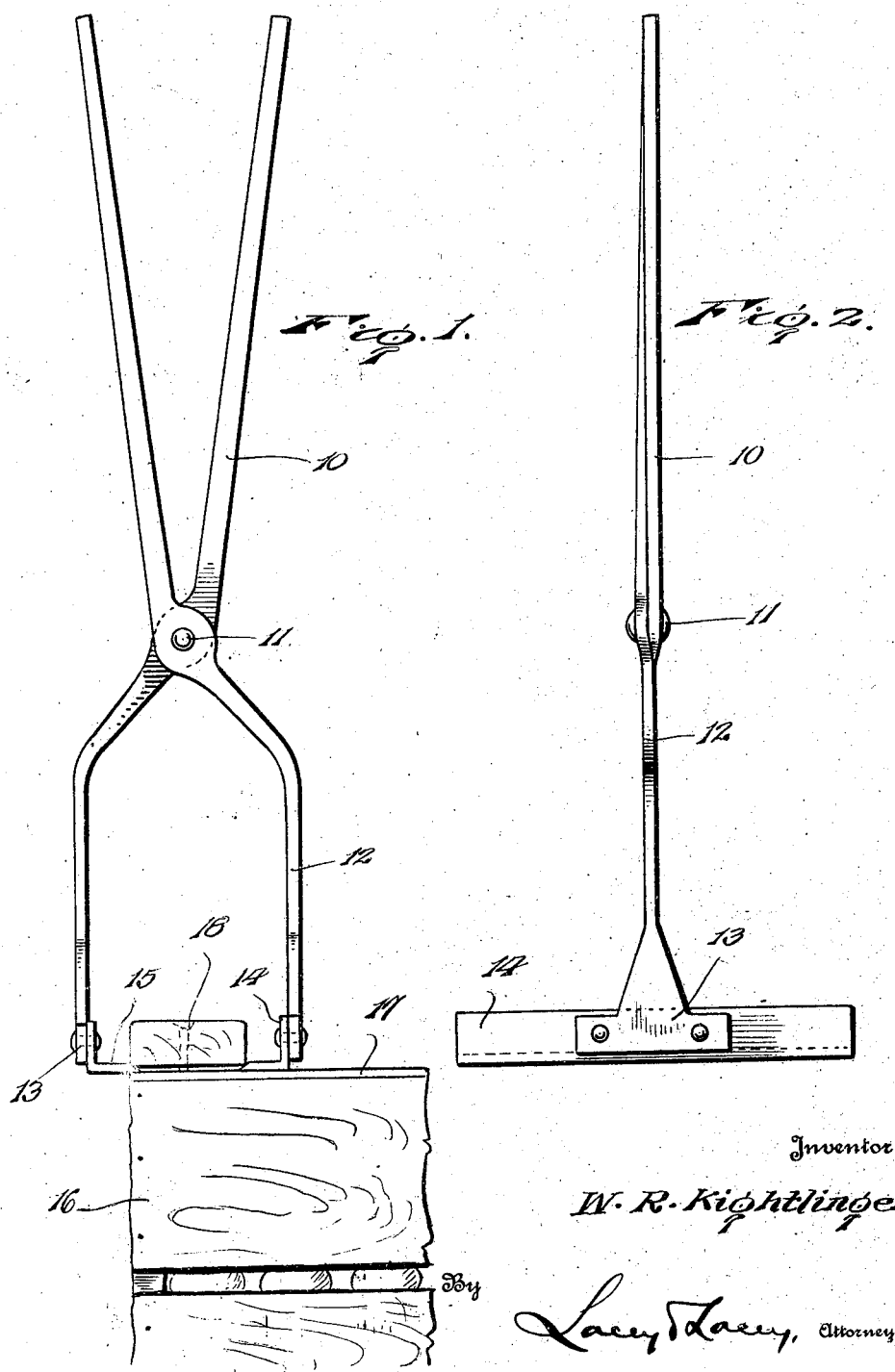

Patented Feb. 19, 1924.

1,484,222

UNITED STATES PATENT OFFICE.

WALTER RALEIGH KIGHTLINGER, OF PARSONS, KANSAS.

CLEAT REMOVER.

Application filed July 19, 1922. Serial No. 576,133.

*To all whom it may concern:*

Be it known that I, WALTER R. KIGHTLINGER, a citizen of the United States, residing at Parsons, in the county of Labette and State of Kansas, have invented certain new and useful Improvements in Cleat Removers, of which the following is a specification.

The present invention relates to an implement intended for use in opening crates and the like. Fruit, such as oranges, apples and tomatoes are packed for shipment in crates which generally have their tops held down by transverse cleats, and it is often necessary to open these crates to inspect the contents and to again close them for reshipment. In such a case it is desirable to open the crates without destroying the nails, and the object of the present invention is to provide an implement by means of which it is possible to remove a cleat and all its nails in one operation, so that the cleat may readily be put back into position.

In the accompanying drawing one embodiment of the invention is illustrated, and—

Figure 1 is a side view of the implement shown in position on the crate ready to remove the cleat, and—

Fig. 2 is an end view of the implement.

The implement is constructed in the shape of a pair of tongs having long shanks 10 constituting handles, hinged together, as at 11, and provided with a pair of jaws 12 on the opposite side of the hinge. These jaws terminate each with a T-shaped flat piece 13. To these flat pieces 13 are riveted, or in any other suitable manner secured, a pair of L-shaped bars 14 positioned with their lower flanges 15 opposite each other in order to provide gripping members for the cleats. These flanges 15 are preferably thin and tapered towards their edges and the length of each bar is considerably greater than the flat pieces 13 of the jaws 12. The length of the bars is approximately the same as the length of the cleats to be removed or the width of the crates intended to be opened by the implement.

In Fig. 1 the reference numeral 16 represents a crate having top boards 17 held down by cleats 18. By straddling the implement over the cleat, as shown in this figure and gripping the cleat tightly by means of the thin flanges 15 of the implement, the cleat is first loosened by rocking the implement in one direction, whereupon the thin flange 15 will easily slip under the loosened side of the cleat. By a quick wrench of the implement the cleat will thereby become detached from the crate, together with all its nails. The cleat will then be ready for use to again close the crate for reshipment.

In using the implement it is best to rock it inwards over the crate after a tight grip has been applied around the cleat. In this manner the elbow of the gripping bar resting on the top of the crate will form a fulcrum to give a good purchase for detaching the cleat.

Having thus described the invention, what is claimed as new is:

1. A cleat puller comprising a pair of tongs including two Z-shaped shanks each providing a handle portion, and a jaw portion hinged together at the bend adjacent the handle portion, and an L-bar rigidly secured to the free end of each of said jaw portions and having greater length than the same, the thin opposing ledges of said bars constituting gripping elements.

2. A cleat puller comprising a pair of tongs including two Z-shaped shanks each providing a handle portion, and a jaw portion hinged together at the bend adjacent the handle portion, said jaw portion terminating with a transversely extending blade, a V-shaped reinforcement adjacent said blade, and an L-bar rigidly secured to each of said plates and having greater length than the same, the thin opposing ledges of said bars constituting gripping elements.

In testimony whereof I affix my signature.

WALTER RALEIGH KIGHTLINGER. [L. S.]